US006882764B1

(12) United States Patent
Deng et al.

(10) Patent No.: US 6,882,764 B1
(45) Date of Patent: Apr. 19, 2005

(54) POLARIZATION INDEPENDENT PACKAGING FOR POLARIZATION SENSITIVE OPTICAL WAVEGUIDE AMPLIFIER

(75) Inventors: Qi Deng, Cupertino, CA (US); Steve Wang, San Jose, CA (US); Frank H. Levinson, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/646,422

(22) Filed: Aug. 22, 2003

Related U.S. Application Data
(60) Provisional application No. 60/427,757, filed on Nov. 20, 2002.

(51) Int. Cl.[7] .............................. G02B 6/12; H01S 3/07
(52) U.S. Cl. ......................................... 385/14; 359/333
(58) Field of Search ................................. 385/8–16, 27, 385/32, 49, 129–132; 359/341.1, 341.32, 333, 334; 372/6, 70; 356/4.01

(56) References Cited

U.S. PATENT DOCUMENTS

| | | | |
|---|---|---|---|
| 6,288,833 B1 * | 9/2001 | Kasamatsu ................... | 359/333 |
| 6,700,697 B1 * | 3/2004 | Nikolajsen et al. .... | 359/341.32 |
| 6,748,142 B1 * | 6/2004 | Madsen ........................ | 385/49 |
| 2002/0075472 A1 * | 6/2002 | Holton ....................... | 356/4.01 |
| 2003/0002143 A1 * | 1/2003 | Inoue et al. ............. | 359/341.3 |
| 2003/0137722 A1 * | 7/2003 | Nikolajsen et al. ....... | 359/341.1 |
| 2003/0202749 A1 * | 10/2003 | Madsen ........................ | 385/49 |

OTHER PUBLICATIONS

Djordjev, Konstadin et al, "Microdisk Tunable Resonant Filters and Switches," *IEEE Photonics Technology Letters*, vol. 14, No. 6, Jun. 2002, pp. 828–830.

K&L Microwave Inc., "A Tunable, Dielectric Waveguide Filter," Augusy 1998, http://www.klmicrowave.com/news/articlearch/aug1998mj.htm, pp. 1–3.

Mateus, Carlos F. R. et al., "MEMS Tunable Filters," http://buffy.eecs.berkely.edu/ResearchSummary/02abstracts/mateus.1.html, viewed Apr. 16, 2003, pp. 1–3.

Pfeiffer, J. et al., "Tunable Wavelength–Selective WDM Photodetector Based on MOEMS," Institut fur Hochfrequenztechnik, pp. 94–98.

Sadot, Dan et al., "Tunable Optical Filters for Dense WDM Networks," IEEE Comunications Magazine, Dec. 1998, http://www.comsoc.org/ci/private/1998/dec/sadot.html, pp. 1–9.

\* cited by examiner

*Primary Examiner*—Akm Enayet Ullah
(74) *Attorney, Agent, or Firm*—Workman Nydegger

(57) ABSTRACT

A waveguide optical amplifier package has a circulator and a planar waveguide amplifier optically communicating with the circulator. A core of the circulator receives an input beam, separates the input beam into a first beam and a second beam, and manipulates the first beam and the second beam so that they have the same polarization as they enter the waveguide. The waveguide includes one waveguide for each beam or a single waveguide that receives both beams. Following amplification of the beams power levels, the beams are directed into the circulator which combines the beams into an output beam that exits the circulator.

28 Claims, 13 Drawing Sheets

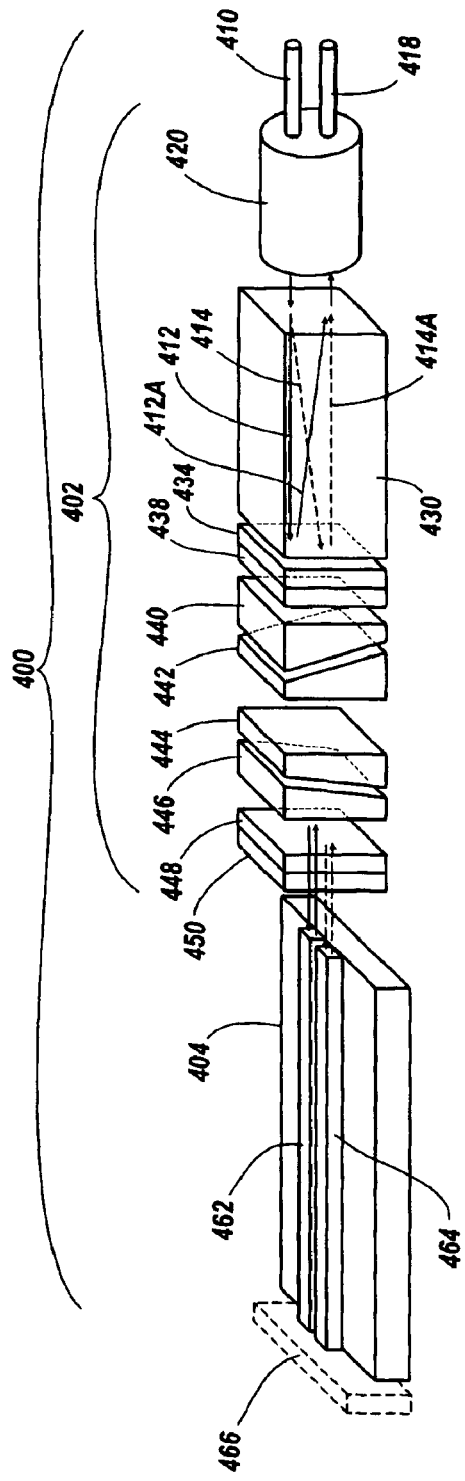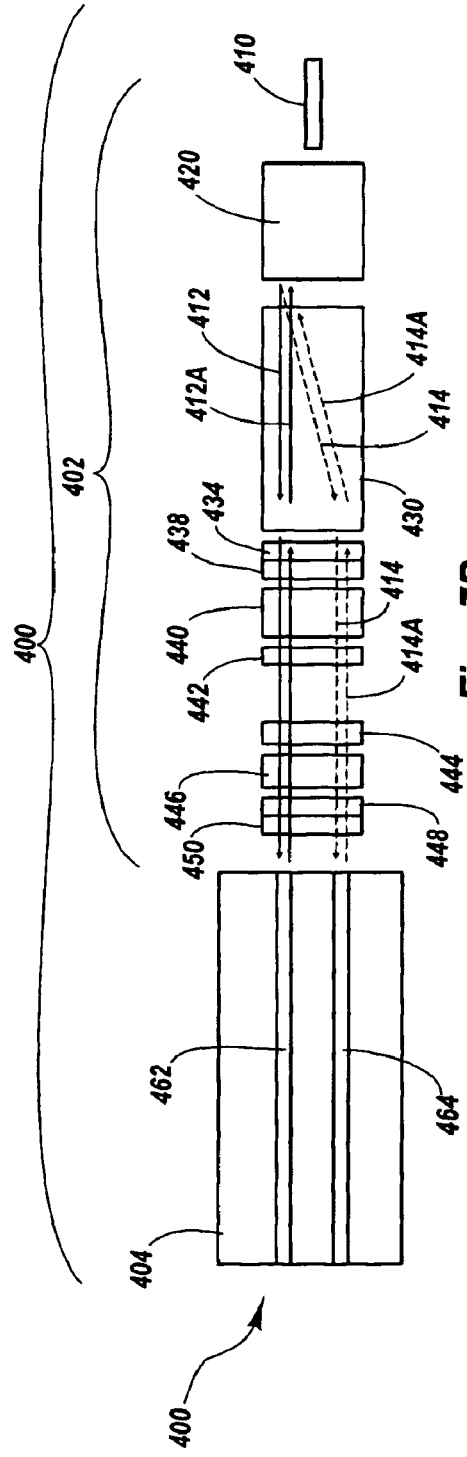
Fig. 7A
Fig. 7B

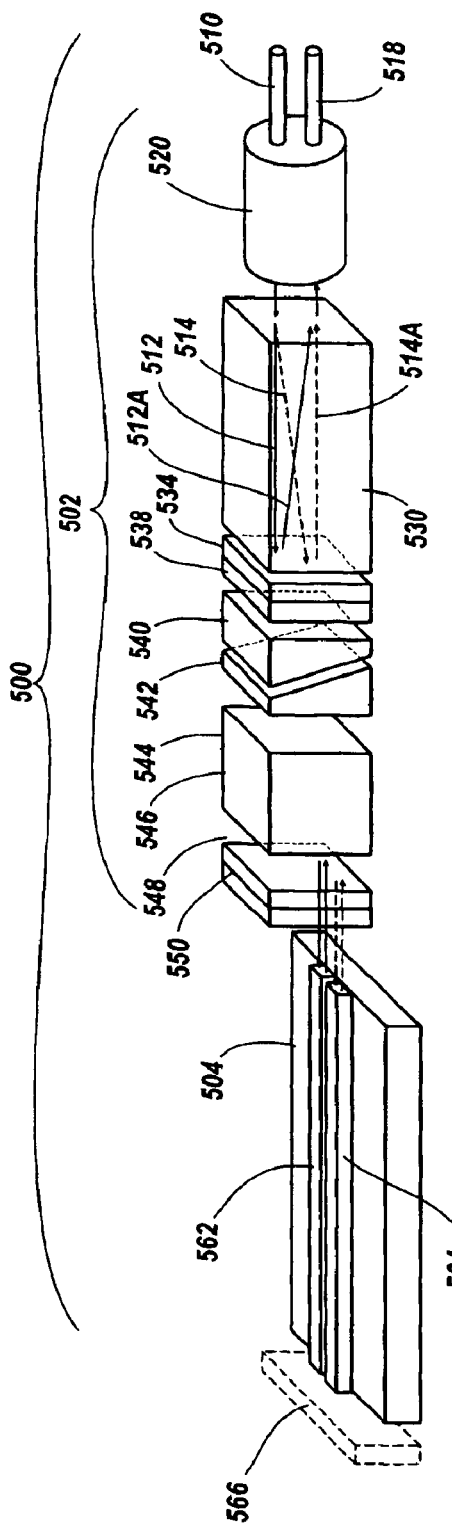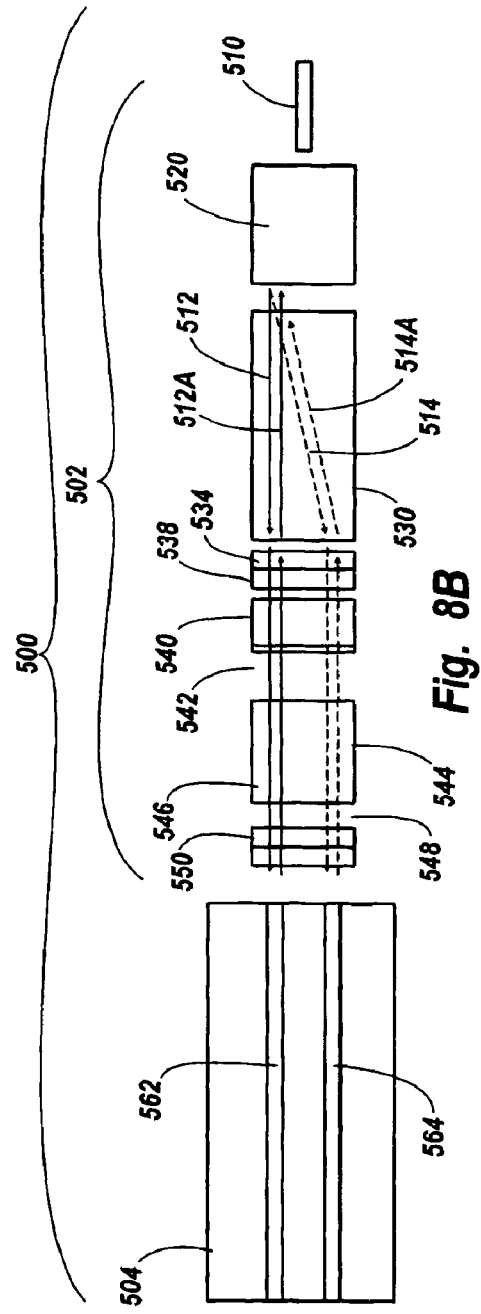
Fig. 8A
Fig. 8B

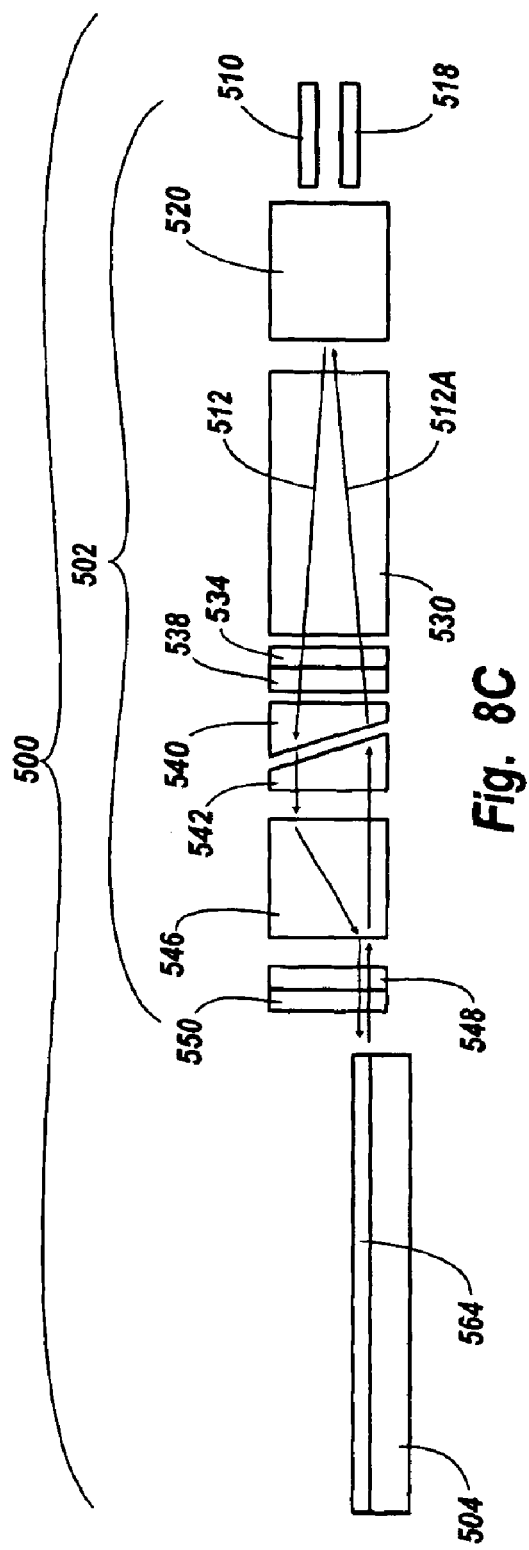

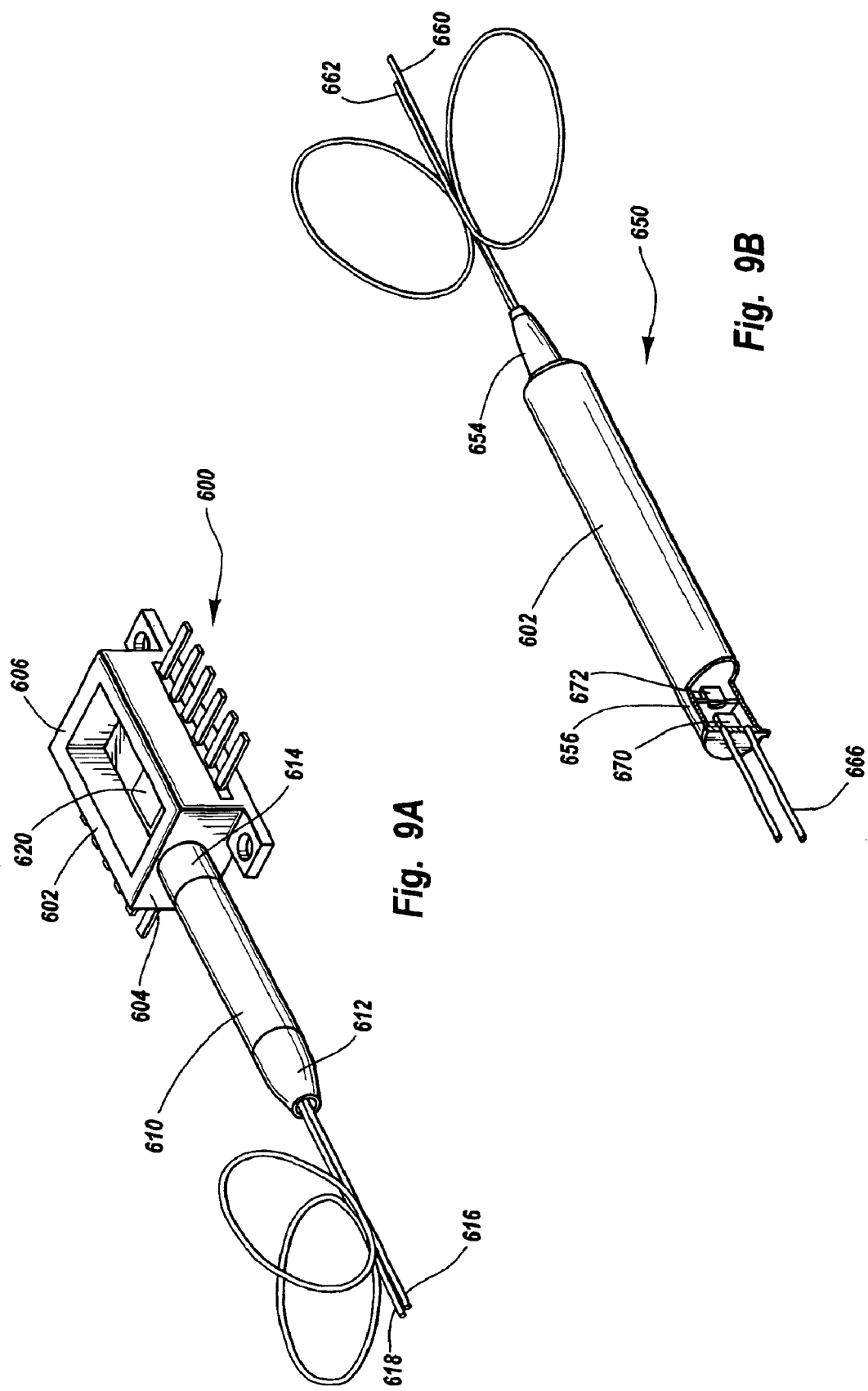

POLARIZATION INDEPENDENT PACKAGING FOR POLARIZATION SENSITIVE OPTICAL WAVEGUIDE AMPLIFIER

CROSS-REFERENCE TO RELATED APPLICATIONS

This patent application claims priority to and the benefit of U.S. Provisional Patent Application Ser. No. 60/427,757, entitled Polarization Independent Packaging for Polarization Sensitive Optical Waveguide Amplifier, filed on Nov. 20, 2002, which is hereby incorporated by reference in its entirety.

BACKGROUND OF THE INVENTION

1. The Field of the Invention

The present invention generally relates to optical wave guides and optical wave guide amplifiers for use in optical networks. More specifically, the present invention relates to packaging for optical waveguide amplifiers.

2. The Relevant Technology

Optical networks are widely used to communicate data over short and long distances in various networks, including telecommunications and data networks. Optical networks using optical fibers have become a preferred way of transmitting data due to the high bandwidth inherent in optical networks, as well as the decreasing cost of components of such networks. In optical networks, data is encoded in optical signals, which are transmitted over optical fiber between nodes in the network. Optical transceivers are used to convert electrical signals to optical signals and vice versa and to transmit and receive optical signals that are propagated over the optical network.

When optical signals are sent over long distances, they may need to be repeated or amplified to ensure the signals do not degrade to the point of data loss. Such losses result in slower overall transmission times and lower data rates in a given band. There are both theoretical and practical limits to the data speeds that can be obtained in a fiber optic network.

Light traveling through different media is reflected and refracted at each interface where the index of refraction changes. The amount of light deflected and the directions of deflection depend on the angle of incidence with the interface and the refractive indices of the media across the interface. For example, approximately 4% of the light traveling from glass into air and approaching the interface at a normal direction is reflected backward into the glass along the same normal direction of incidence. The remaining 96% proceeds, in this case with unchanged direction, into the air.

One component of an optical network where light passes from one media to another is an optical planar waveguide. An optical waveguide is a light conduit having a slab, strip or cylinder of dielectric material surrounded by another dielectric material having a lower refractive index. Optical planar waveguide technology has been widely used to build components in optical communication networks, such as switches, amplifiers, modulators, MUXs, DEMUXs, etc.

FIGS. 1A and 1B show an existing planar waveguide for an amplifier. Wave guide 10 is made by sandwiching a first dielectric material 14 between two sheets of a second dielectric material 12. A beam of light 16 entering the first dielectric material 14 is constrained within this material by the second dielectric material 12.

Given that the light is traveling in the z direction, the two normalized modes for the propagating light are linearly polarized waves with polarization along the x and y directions. The x-polarized mode is called transverse electric (TE) polarization, while the y-polarized mode is called the transverse magnetic (TM) polarization. Polarization dependent loss (PDL) in the propagating light or signal is caused because the TE and TM modes travel with different propagation conditions in the planar waveguide. The result is a large PDL, which is unacceptable in most planar waveguide devices.

A technique to reduce the PDL is shown in FIG. 2. An input light beam 110 is split into two orthogonal polarization beams 112, 114 by a birefringence crystal beam displacer 116. The polarization of one of the beams 112 is rotated 90° after passing through a λ/2 waveplate 118 so that both beams 112, 114 have identical polarization. Then both of the beams 112, 114 are launched into a waveguide 120 as TE waves. Upon exiting the waveguide 120, the polarization of one of the beams 114 will rotate 90° after passing through a second λ/2 waveplate 122 such that the two beams 112, 114 again have orthogonal polarizations. The two beams 112, 114 will then be re-combined into one beam 126 by a second birefringence crystal beam displacer 124.

Unfortunately, the technique uses an in-line configuration where light beam 110 enters waveguide 120 from one side and exits from the opposite side of waveguide 120. This is difficult to implement in situations where a reduction in PDL is desired in a non-in-line situation.

BRIEF SUMMARY OF THE INVENTION

The present invention generally relates to a polarization independent packaging for a polarization sensitive optical waveguide amplifier. This embodiment of a planar waveguide optical amplifier may be effectively used to amplify data signals that are transmitted between, for example, 20 km and 120 km, although the amplifier of the present invention may be used to transmit signal in a variety of distances lesser than 20 km and greater than 120 km.

In one exemplary embodiment, the input beam is split into two parallel beams with orthogonal polarizations. The two beams propagate through a core having at least one polarization shifting component and at least one beam shifting component or assembly. These components or assembly rotate the polarization until both beams have the same polarization state. Further, the components and/or assemblies cause the beams to be bent so that they enter the desired portions of the waveguide, i.e., a single or multiple waveguides forming the package.

The beams and their associated signals are amplified as they propagate through the waveguide. Following amplification, the beams are directed into the circulator. Due to the orientation of the at least one polarization shifting component and the at least one beam shifting component or assembly, the beams are combined into an output beam having an output path separated from that of the input beam. The input beam exits from the output port of the circulator and enters an output fiber.

In one configuration, the core of the circulator includes one or more waveplates and one or more Faraday rotators. These optical components change a polarization state of the beams and may be considered as polarization shifting components. Cooperating with these polarization shifting components can be one or more optical wedges and one or more beam displacers. These components shift the optical path of the propagating beams so the beams may enter the waveguide at the desired locations or may be combined to form the output beams. Consequently, theses components may be considered as beam shifting components, while the combination thereof may be considered as a beam shifting assembly.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7A is a perspective view of a waveguide optical amplifier according to one aspect of the present invention showing the path of the light beam from input to output;

FIG. 7B is a top view of the wave guide optical amplifier shown in FIG. 7A;

FIG. 8A is a perspective view of a wave guide optical amplifier according to another aspect of the present invention showing the path of the light beam from input to output;

FIG. 8B is a top view of the wave guide optical amplifier shown in FIG. 8A;

FIG. 8C is a side view of the wave guide optical amplifier shown in FIG. 8A;

FIG. 9A shows one embodiment of a wave guide device package with an integrated circulator according to one aspect of the invention; and FIG. 9B shows an alternate embodiment of a wave guide device in a TO package according to another aspect of the invention.

DETAILED DESCRIPTION OF THE PREFERRED EMBODIMENTS

Because of the PDL problem of planar waveguide devices, a new technique to reduce or eliminate TE and TM wave effects is proposed. In one configuration, a modified circulator is integrated into a waveguide package. The integrated device splits an input beam into two beams with identical polarization and launches these two beams into a planar waveguide as TE waves. The two beams propagate through the waveguide with the same TE polarization and are transmitted back into the circulator. The modified circulator then couples the beams together and transmits the combined beam out so that the input port and the output port are collocated on the same end of the circulator and waveguide device. In this manner, PDL is reduced or eliminated when compared with existing technologies because the beams propagate through the planar waveguide with identity of polarization, i.e., as TE waves. Further, the input beam and the output beam to the amplifier are collocated upon the same end of the device, thereby making installation and usage of the package simpler than existing devices.

Figure 1A:
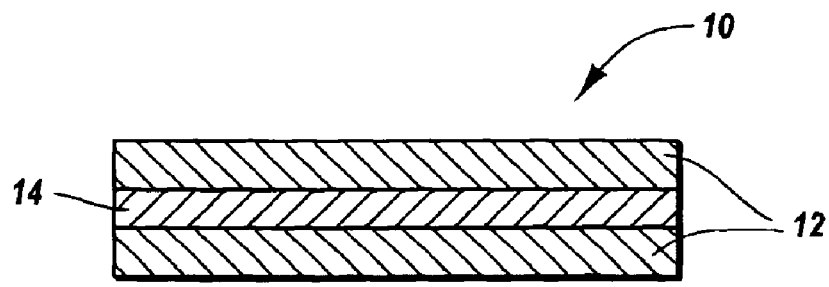
FIGS. 1A and 1B illustrates an existing planar waveguide.
Figure 1B:
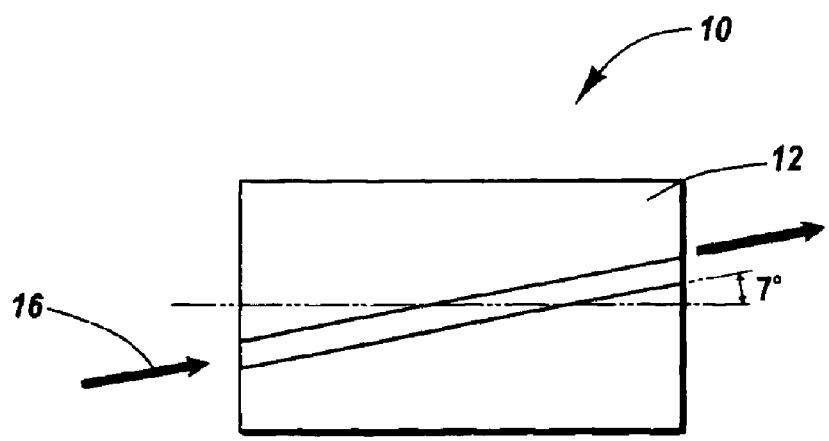
Figure 2:
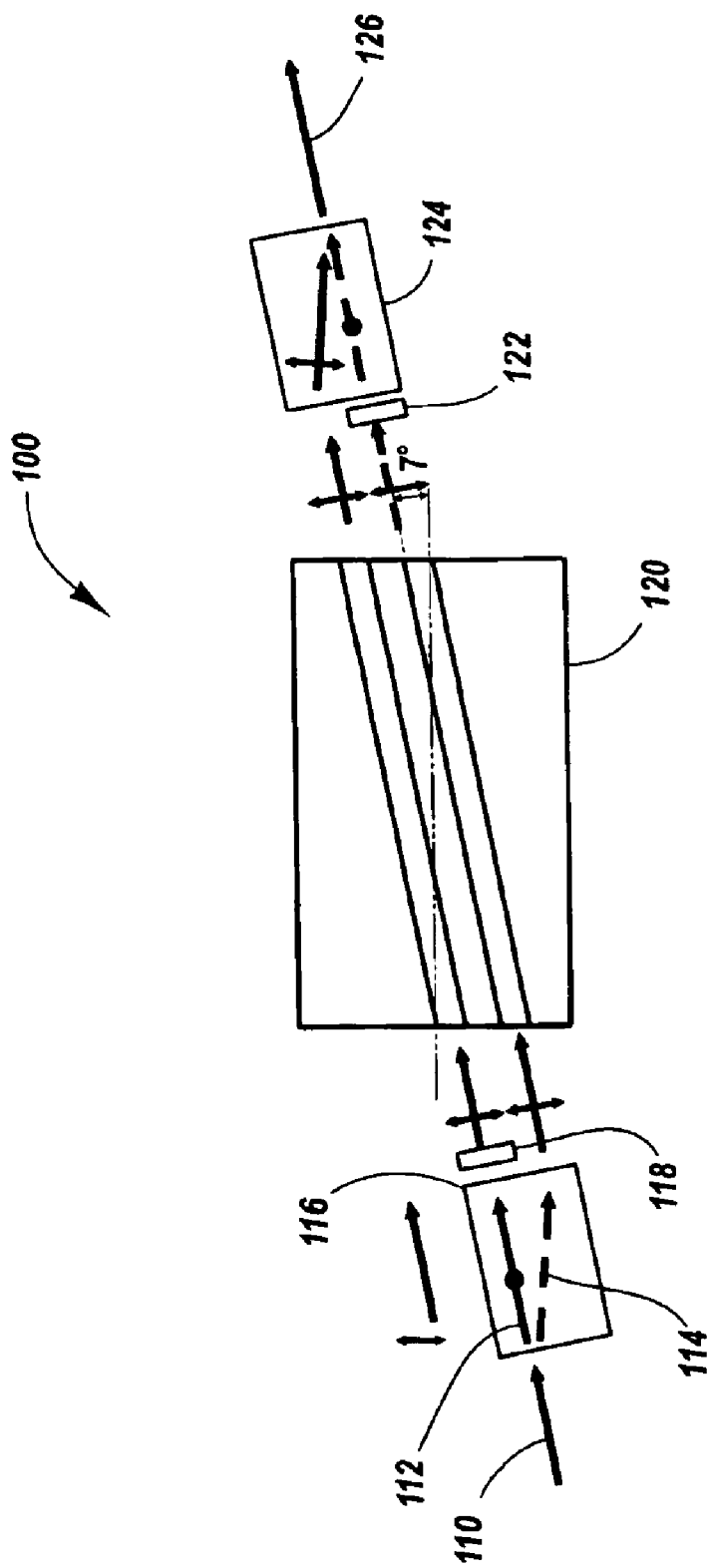
FIG. 2 shows a top view of a planar wave guide using a conventional method for reducing Polarization Dependent Loss (PDL) using a birefringence crystal beam displacer to split the input beam into two orthogonal polarization beams.
Figure 3:
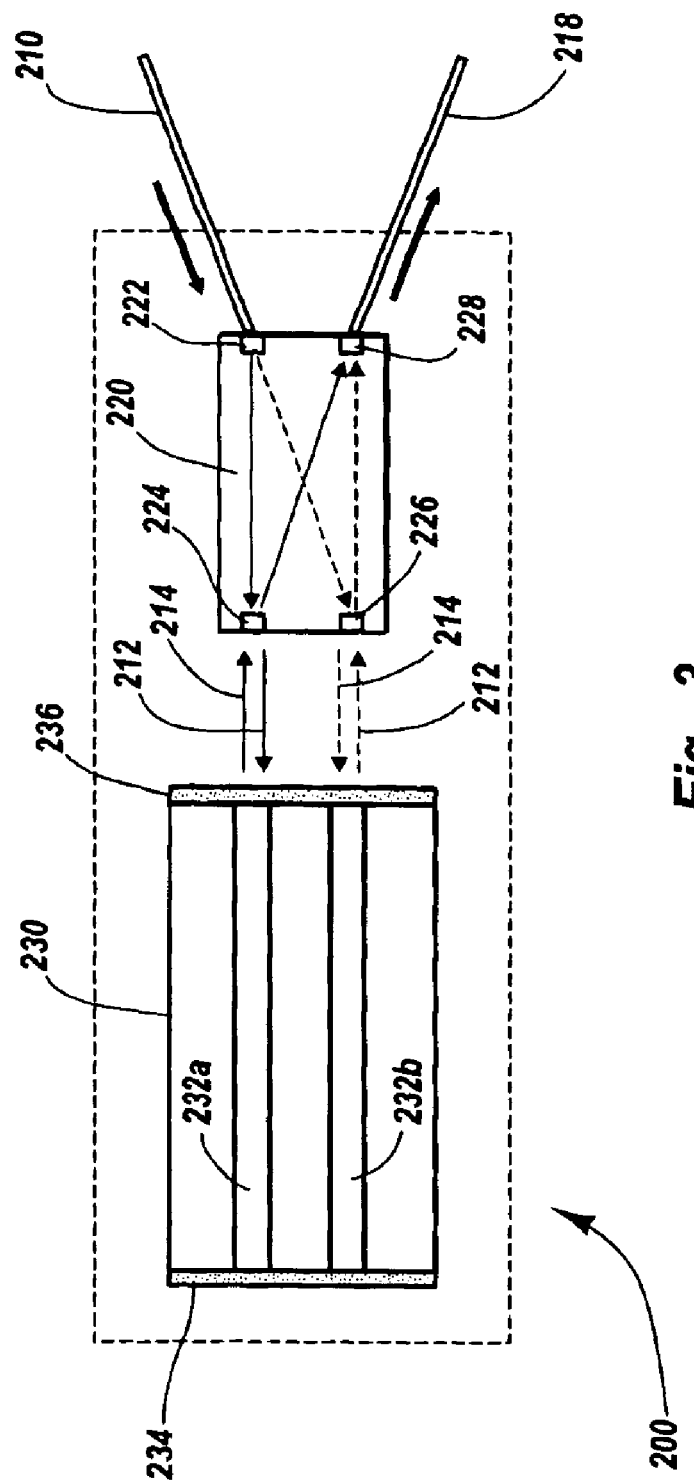
FIG. 3 is a diagram illustrating how a circulator works in an amplifier application of the wave guide.

FIG. 3 illustrates schematically a waveguide package according to one aspect of the present invention. The waveguide package 200 functions as an amplifier, while having a structure that reduces or eliminates PDL. As illustrated, waveguide package 200 includes a circulator 220 in optical communication with an amplifier 230. The circulator 220 includes four ports 222, 224, 226, and 228. A beam input into port 222, such as along optical fiber 210, is split into two beams 212 and 214 that exit circulator 220 from ports 224 and 226 respectively with the same polarization state, i.e., TE waves. Circulator 220 also receives beams 212 and 214 in the backward direction through ports 224 and 226 following passage of such beams through amplifier 230. When beam 212 enters circulator 220 through port 224 and beam 214 enters circulator 220 through port 226, circulator 220 combines beams 212 and 214 into a single beam that exits circulator 220 through port 228 and enters an output fiber 218. The circulator 220 achieves the separation and combining functions by changing the optical path of portions of the input beam and the output beam based upon the polarization state of such portions. For instance, the input beam incident upon circulator 220 through port 222 is separated based upon which portions of the beams have TE polarization or TM polarization; portions of the input beam have a first polarization state, such as TE polarization, being propagated as beam 212, while portions of the input beam having a second polarization state, such as TM polarization, being propagated as beam 214. Similarly, circulator 220 combines beams 212 and 214 based upon these polarization states, i.e., the output beam propagating into output optical fiber 218 has a mixed polarization state combining both TE polarization and TM polarization states.

Amplifier 230 includes two optical amplifier waveguides 232a and 232b disposed between a highly reflective coating or layer 234 and an anti-reflection coating or layer 236. These amplifier waveguides 232a and 232b amplify or increase the power of beams 212 and 214 without converting the optical signals to electrical signals. For instance, each amplifier waveguide 232a and 232b may include an erbium or other doped fiber and a pump laser (not shown) to increase signal output power without electronic conversion.

Highly reflective coating or layer 234 reflects beams 212 and 214 incident thereupon substantially without power loss. Various coating structures are known that act as a reflective coating and function to reflect an incident beam.

Similarly, anti-reflection coating or layer 236 prevents beams 212 and 214 being reflected upon being incident upon the interface between amplifier 230 and the surrounding medium, whether air or some other medium. Various coating structures are known that act as the anti-reflection coating and function to prevent reflection of an incident beam.

In operation, circulator 220 splits input beam 210 into two beams 212, 214 with different polarization states, i.e., one beam having TE polarization and one beam with TM polarization, modifies the polarization state of beams 212, 214 so they both have the same polarization state, i.e., TE polarization, and then launches these modified beams 212, 214 into amplifier 230. The beams 212 and 214 pass through anti-reflective coating 236 at the input side or end of amplifier 230. These beams 212 and 214 are reflected from reflective coating 234 at the opposite side or end of amplifier 230. During passage of beams 212 and 214 through amplifier 230, the combination of a pump laser (not shown) and the erbium or other doped fiber, in this exemplary embodiment, increases the power level of each beam 212 and 214. Following reflection from coating 234, beams 212, 214 are coupled together in circulator 220 and transmitted out port 228 of circulator 220 and into optical fiber 218 as the output beam having a mixed polarization state, i.e., both TE components and TM components.

Figure 4:
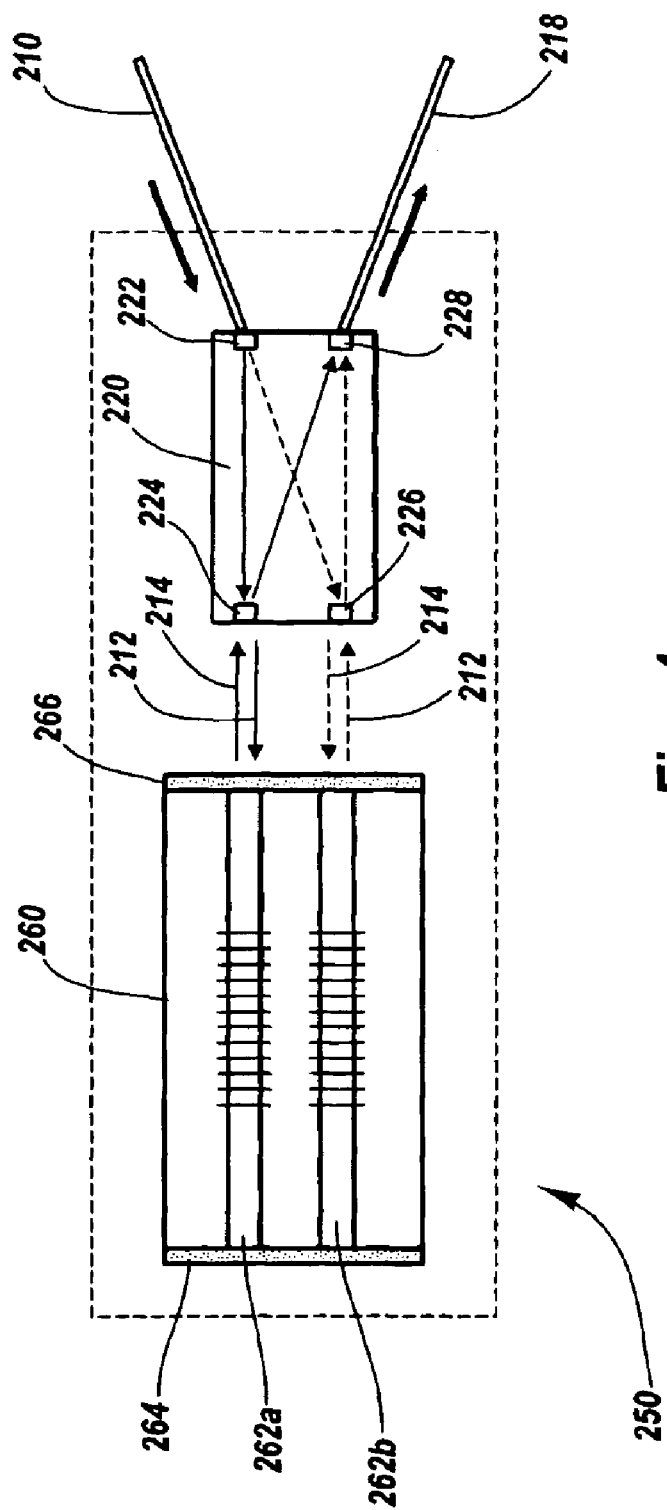
FIG. 4 is a diagram illustrating how a circulator works in a wave guide tunable filter application.

FIG. 4 illustrates schematically a waveguide package according to another aspect of the present invention. The waveguide package 250 functions as a waveguide tunable filter, while having a structure that reduces or eliminates the PDL. As is known in the art, optical transmitters used in long distance fiber optic communications systems use Wavelength Division Multiplexing (WDM) to divide the bandwidth of the optical signal into multiple bandwidths to allow for greater data transmission rates. In WDM systems, each channel is related to a different wavelength. Channel selection and manipulation uses optical filtering to selectively filter out the desired or unwanted channels/signals. Such selective filters are known as tunable filters.

Package 250 has a similar configuration to package 200 discussed with respect to FIG. 3. One difference between package 200 and package 250 is filter 260. Filter 260 may include an anti-reflective coating 266 at its input side or end and a highly reflective coating 264 placed on the opposite side or end of filter 260. These coatings 264 and 266 may have a similar configuration to coatings 234 and 236 described with respect to FIG. 3.

Disposed between coatings 264 and 266 are two filter waveguides 262a and 262b. These filter waveguides 262a and 262b may optically communicate with optical fibers or other optical components (not shown) that are to receive specific wavelengths of electromagnetic waves filtered from beams 212 and 214 by filter waveguides 262a and 262b. Depending on the specific properties desired, filter waveguides 262a and 262b may be Fabry Perot interferometer tunable filters, Mach-Zender tunable filters, acousto-optic tunable filters, Electro-optical tunable filters, ring-resonator tunable filter, or other filters capable of filtering out the desired or unwanted channels/signals.

Figure 5:
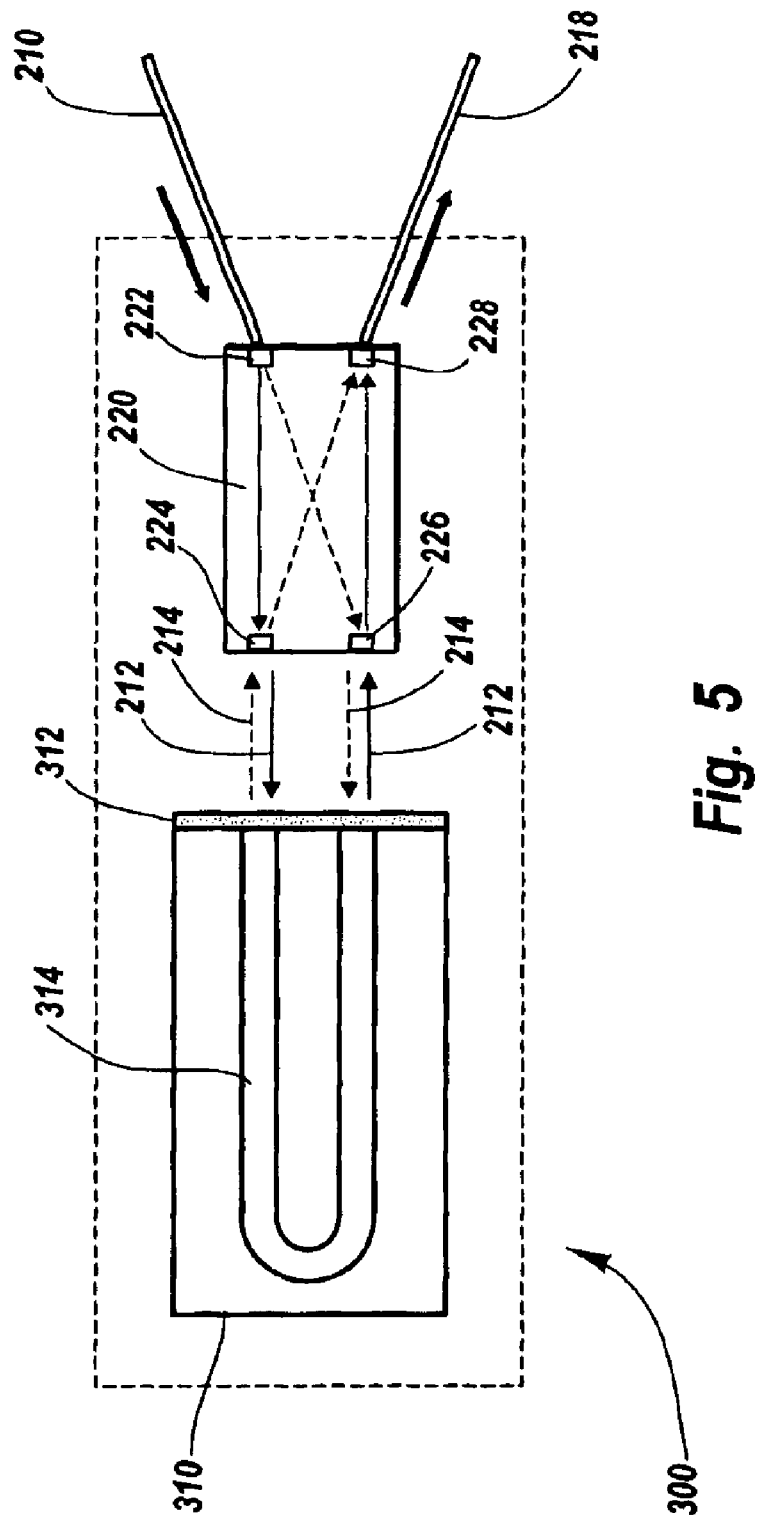
FIG. 5 is a diagram illustrating a "U" shaped wave guide which could be either an amplifier or a tunable filter that is used in an integrated package.

FIG. 5 illustrates schematically a waveguide package according to another aspect of the present invention. The waveguide package 300 may function as either an amplifier or a tunable filter within the integrated waveguide package 300. Package 300 has a similar configuration to packages 200 and 250 discussed with respect to FIGS. 3 and 4. One difference between packages 200 and 250 and package 300 is the inclusion of a waveguide 310 having a U-shaped waveguide 312. In this configuration, individual TE beams 212, 214 output from circulator 220 are transmitted in one end of U-shaped waveguide 312 and are transmitted out the other end. The TE beam 212 enters the top portion of waveguide 312 and exits the bottom portion, while TE beam 214 enters the bottom portion and exits the top portion.

This structure allows the two beams 212, 214 that were split from a single input beam 210 to have identical optical paths. This technique of propagating the two beams 212, 214 through the same path eliminates the effects of polarization mode dispersion that may occur when two beams propagate in different waveguides having differing lengths. In addition, this structure also allows the input and output ports to be located on the same physical side of the waveguide and circulator.

Figure 6:
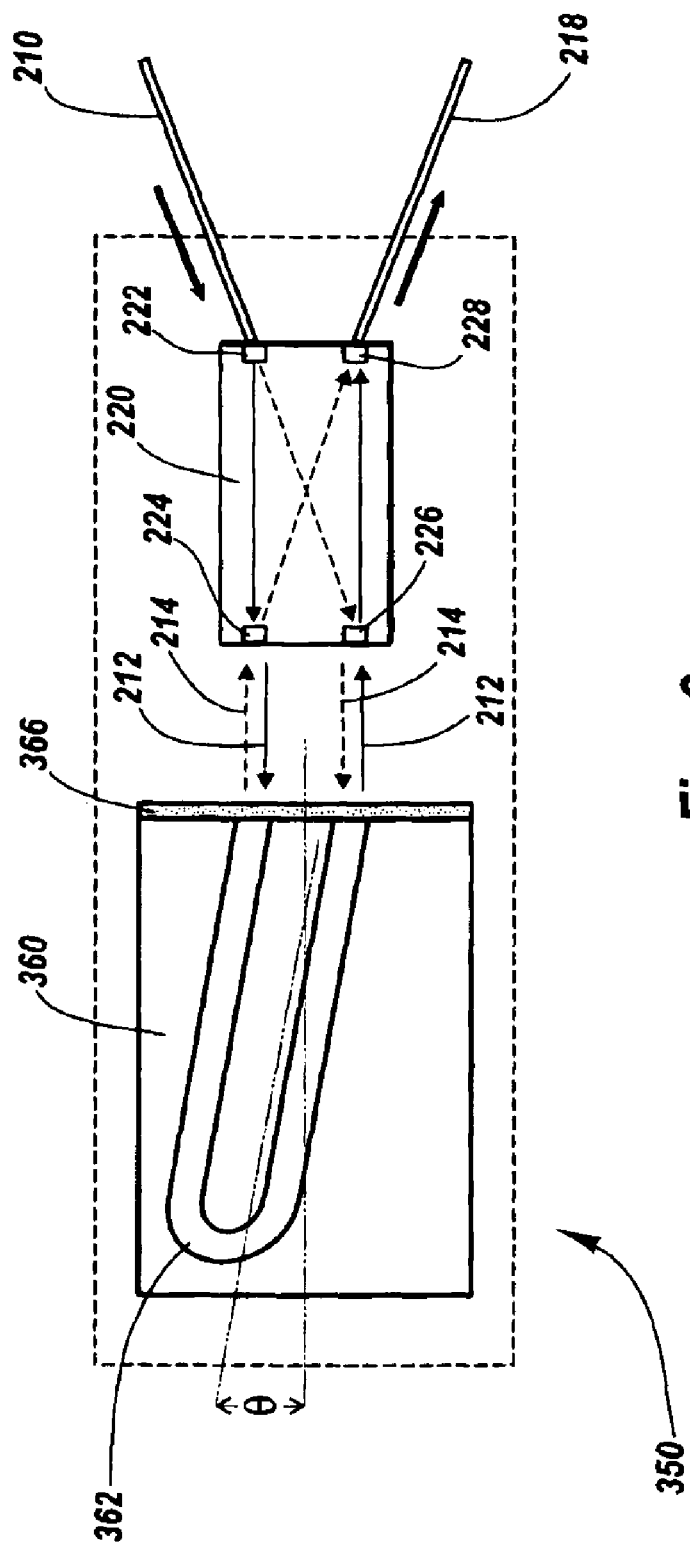
FIG. 6 is a diagram showing a "U" shaped wave guide that is tilted at an angle.

FIG. 6 shows an alternate configuration of package 300. This package 350 includes a waveguide 360 having a tilted U-shaped waveguide 362. As with the configuration of FIG. 5, individual TE beams 212, 214 are transmitted in one end of U-shaped waveguide 362 and are transmitted out the other end. TE beam 212 enters the top portion of waveguide 360 and exits the bottom portion, while TE beam 214 enters the bottom portion and exits the top portion. As with other packages 200, 250, and 300, waveguide 360 includes an antireflection coating 366 that reduces the reflection of beams 212 and 214 as they enter waveguide 360 and waveguide 362. Even with anti-reflection coating 366 disposed upon an input surface of waveguide 360, the design of waveguide 360, (i.e., angular position of U-shaped waveguide 362), can additionally reduce reflections caused by light being incident at an orthogonal angle on the facets of waveguide 360. These reflections may cause an etalon effect resulting in interference and modulation of beams 212 and 214 as they propagate from input fiber 210 to output fiber 218 due to changes in the phase of the electric field of the portion of beams 212 and 214 reflected at coating 366 and waveguide 360 when compared with the portion of beams 212 and 214 that propagate through waveguide 360. In contrast, beams 212 and 214 are incident upon waveguide 362 at a non-orthogonal angle and so are not reflected back along the optical path propagated by beams 212 and 214 following passage through waveguide 360.

Turn now to FIGS. 7A–D, shown is a more detailed schematic representation of exemplary optical components of one embodiment of the present invention. While the components are shown separated to assist in their identification, it is understood by those skilled in the art that there may or may not be an air gap between any and/or all of the optical components. In a preferred embodiment, there are no air gaps between optical components.

An optical package 400 illustrated in FIG. 7A includes a circulator 402 and a waveguide 404. The structures forming circulator 402 and waveguide 404 may also be applicable to the other circulators and waveguides described herein. Further, although specific examples of optical components forming part of circulator 402 are described herein, one skilled in the art will understand that various other combinations of optical components, optical coating, etc may be used to achieve the desired functions described herein or otherwise understood by the teaching contained herein.

The circulator 402 receives an input beam along an input fiber 410. This input beam is incident upon a lens 420 that forms part of a core 406 of circulator 402. The lens 420 directs the input beam to the remainder of core 406. More specifically, lens 420 directs the input beam to a birefringent crystal beam splitter 430. The lens 420 also delivers an output beam of circulator 402 to output fiber 418. Various lenses may be used to perform the desired function and may optionally include one or more coatings to aid with delivering substantially the entire input beam to circulator 402 and the output beam to optical fiber 418.

Figure 7C:
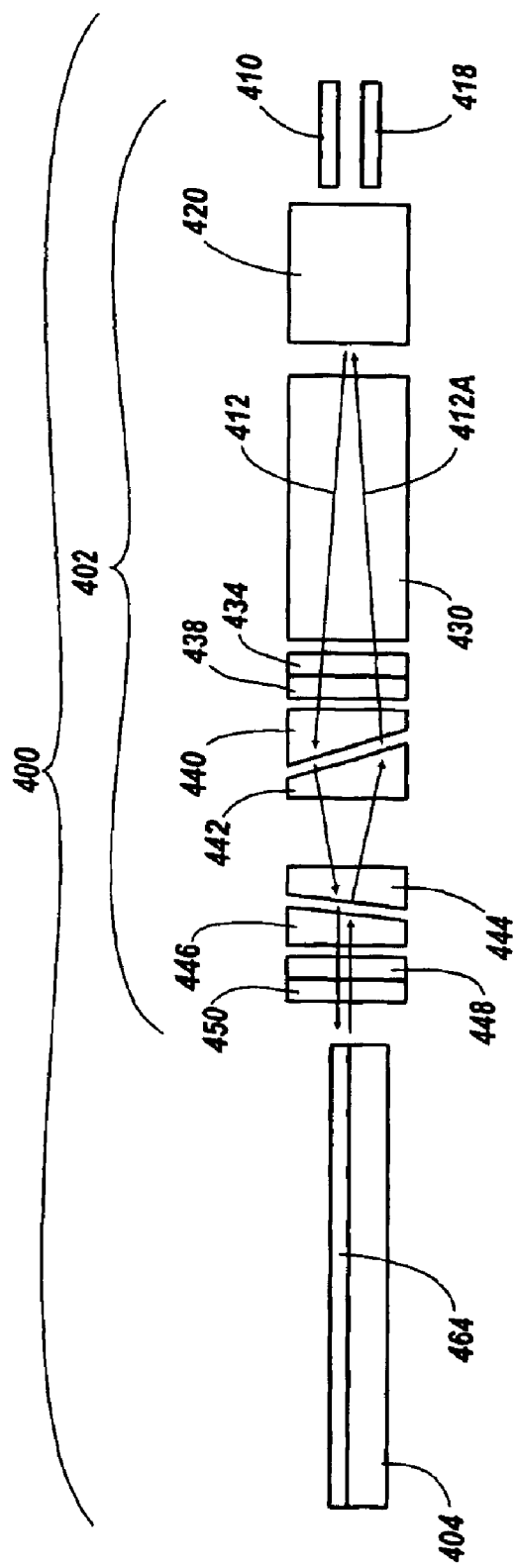
FIG. 7C is a side view of the wave guide optical amplifier shown in FIG. 7A; the wave guide optical amplifier shown in FIG. 7A.
Figure 7D:
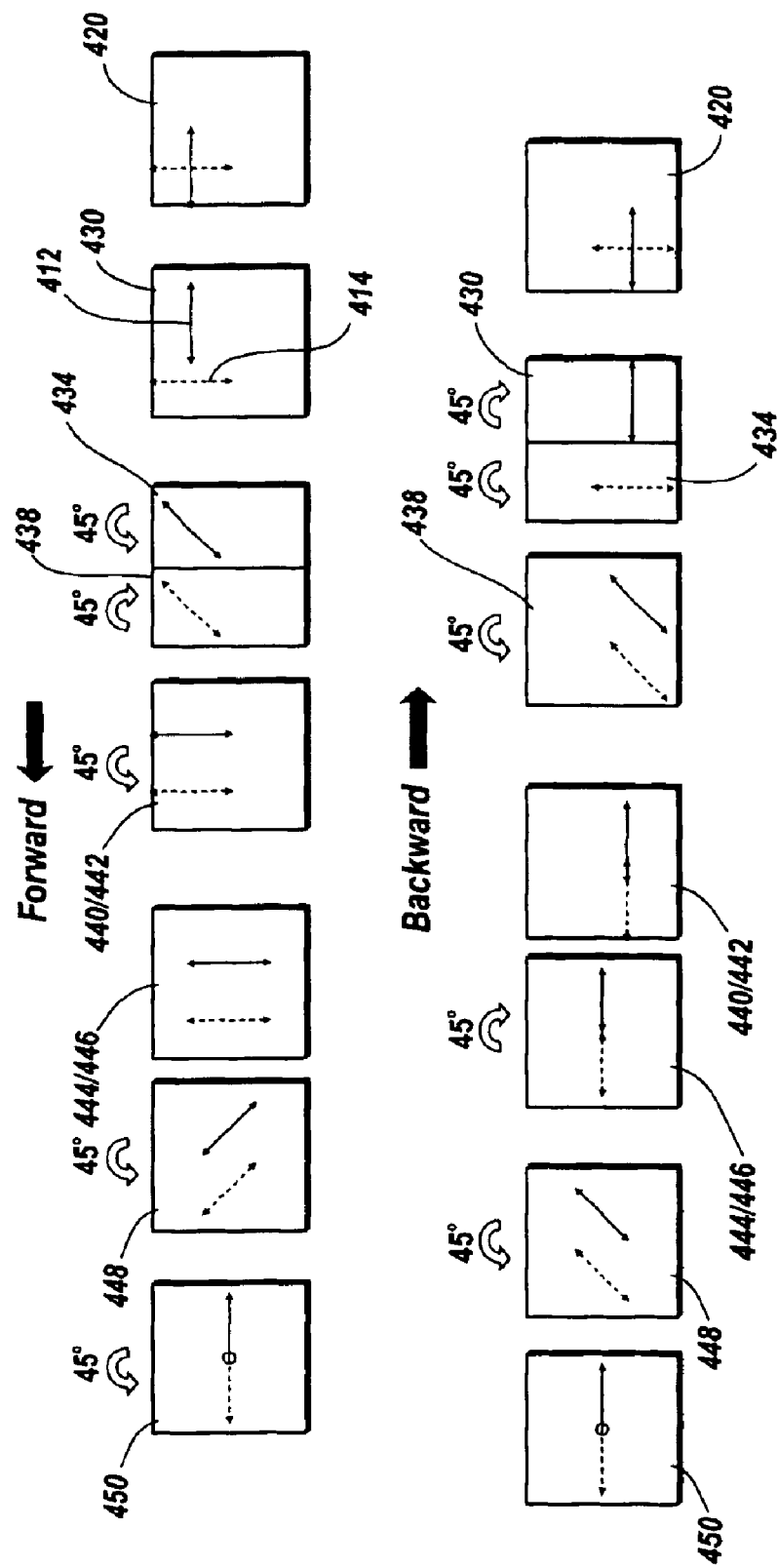
FIG. 7D is a diagram of the wave guide optical amplifier of FIG. 7A showing the direction of polarization of each split, polarized beam as the beams move from the input fiber, through the wave guide amplifier and are combined again at the output fiber.

The beam splitter 430 separates the input beam into two beams 412 nd 414 based upon the polarization of the input beam (FIG. 7D). The beam splitter 430 is one example of a polarization shifting component and also one example of a beam shifting component. Various beam splitters may be used to perform the desired function and may optionally include one or more coatings to aid with preventing reflection losses and splitting the input beam into beams 412 and 414.

The beam splitter 430 optically communicates with a waveplate 434, such as a λ/2 waveplate, and a Faraday rotator 438 of core 406. This combination changes a polarization of one of beams 412, 414 so that both beams 412, 414 have the same polarization state (FIG. 7D). Each of waveplate 434 and Faraday rotator 438 may be considered a polarization shifting component. Although reference is made to a λ/2 waveplate and a Faraday rotator combination to achieve the polarization change, one skilled in the art ill understand that various other combinations of optical components may perform the same function.

The two beams 412, 414 propagate from rotator 438 and pass through two birefringence crystal wedge pairs 440, 442 and 444, 446 of core 406. These wedges 440, 442 and 444, 446 cause beams 412 and 414 to bend toward a center of each wedge 440, 442 and 444, 446. These wedges 440, 442, 444, and 446 may be considered as beam shifting components and collectively as a beam shifting assembly. As with other optical components described herein, wedges 440, 442 and 444, 446 or other optical components capable of performing the same function may optionally include one or more coatings to aid with bending beams 412 and 414 to a center or longitudinal axis of circulator 402.

Once beams 412 and 414 have been bent by wedges 440, 442 and 444, 446, they propagate through another waveplate 448/Faraday rotator 450 combination of core 406 that causes the polarization of beams 412, 414 to rotate another 90° in the same direction. Each of waveplate 448 and Faraday rotator 450 may be considered as a polarization shifting component. The beams 412 and 414 existing from the waveplate 448/Faraday rotator 450 combination subsequently exit circulator 402 and pass into waveguide 404.

Waveguide 404 may have a similar configuration to the waveguides described herein. Consequently, waveguide 404 includes waveguides 462 and 464 and reflection coating or layer 466. Waveguide 462 receives beam 412, while waveguide 464 receives beam 414. It will be understood that the opposite is also possible by changing the configuration of beams splitter 430 and other optical components of circulator 402.

In operation, circulator 402 splits the input beam into two parallel beams 412, 414 using beam displacer 430, as illustrated in FIG. 7B. The two beams 412, 414 have orthogonal polarizations, as shown in FIG. 7D, and are spaced apart at a distance referred to as the walk-off distance. The two beams 412, 414 propagate through waveplate 434 and Faraday rotator 438 so that the polarization of one of two beams 412 and 414 is rotated 90°, as illustrated in FIG. 7D, causing beams 412 and 414 to have the same polarization.

With reference to FIG. 7C, two beams 412, 414 propagate through wedge pairs 440, 442 and 444, 446, causing them to bend toward the center while maintaining the polarization of each beam, as represented in FIG. 7D. The two beams 412, 414 propagate through another waveplate 448 and Faraday rotator 450 changing the polarization of beams 412, 414 to rotate a total of 90° in the same direction, i.e., 450 shift in polarization from each of waveplate 448 and Faraday rotator 450. The two beams 412, 414 pass into and are reflected from waveguide 404.

The reflected beams, now designated 412A and 414A in FIGS. 7A–7C pass back through Faraday rotator 450 and waveplate 448, which rotate the polarization of beams 412A and 414A by 450 in one direction, such as a counterclockwise direction, and 45° in the opposite direction, such as a clockwise direction, as illustrated in FIG. 7D. Therefore, the polarization of beams 412A, 414A remains the same because of the properties of waveplate 448 and Faraday rotator 450.

Beams 412A, 414A pass back through wedge pairs 440, 442 and 444, 446. Since the polarizations of beams 412A, 414A are different from the forward propagating beams 412, 414, beams 412A and 414B are bent in the opposite direction to beams 412 and 414 after they travel through wedge pairs 440, 442 and 444, 446. The polarization of beam 414A rotates 90°, as illustrated in FIG. 7D, so that the polarizations of beams 412A, 414A are again orthogonal after propagating back through Faraday rotator 438 and waveplate 434. The orthogonal beams 412A, 414A are then combined by beam displacer 430 and coupled into an output fiber 418 by lens 420.

This embodiment of a planar waveguide optical amplifier 400 can be effectively used to amplify data signals that are transmitted between, for example, 20 km and 120 km. Electromagnetic wave signals, such as, but not limited to light signals that are transmitted shorter distances often do not require amplification and optical signals that are transmitted longer distances are often more efficiently amplified using a different technique. One advantage of configuring amplifier 400 in the manner shown such that input port 410 and output port 418 are collocated on the same side of the waveguide 404 is that amplifier 400 can more easily be positioned in a TO package, as shown in FIG. 9B and discussed hereinafter.

Shown in FIGS. 8A–8D is a detailed schematic representation of the optical components of an alternative exemplary embodiment of the waveguide package of the present invention. While the components are shown separated to assist in their identification, it is understood by those skilled in the art that there may or may not be an air gap between any and/or all of the optical components. In a preferred embodiment, there are no air gaps between optical components.

An optical package 500 illustrated in FIG. 8A includes a circulator 502 and a waveguide assembly 504. The structures forming circulator 502 and waveguide assembly 504 may also be applicable to the other circulators and waveguides described herein. Further, although specific examples of optical components forming part of circulator 502 are described herein, one skilled in the art will understand that various other combinations of optical components, optical coating, etc may be used to achieve the desired functions described herein or otherwise understood by the teaching contained herein.

The circulator 502 receives an input beam along an input fiber 510. This input beam is incident upon a lens 520 that forms part of a core 506. The lens 520 directs the input beam to the remainder of core 506. More specifically, lens 520 directs the input beam to a birefringent crystal beam splitter 530. The lens 520 also delivers an output beam of circulator 502 to output fiber 518. Various lenses may be used to perform the desired function and may optionally include one or more coatings to aid with delivering substantially the entire input beam to circulator 502 and the output beam to optical fiber 518.

Figure 8D:
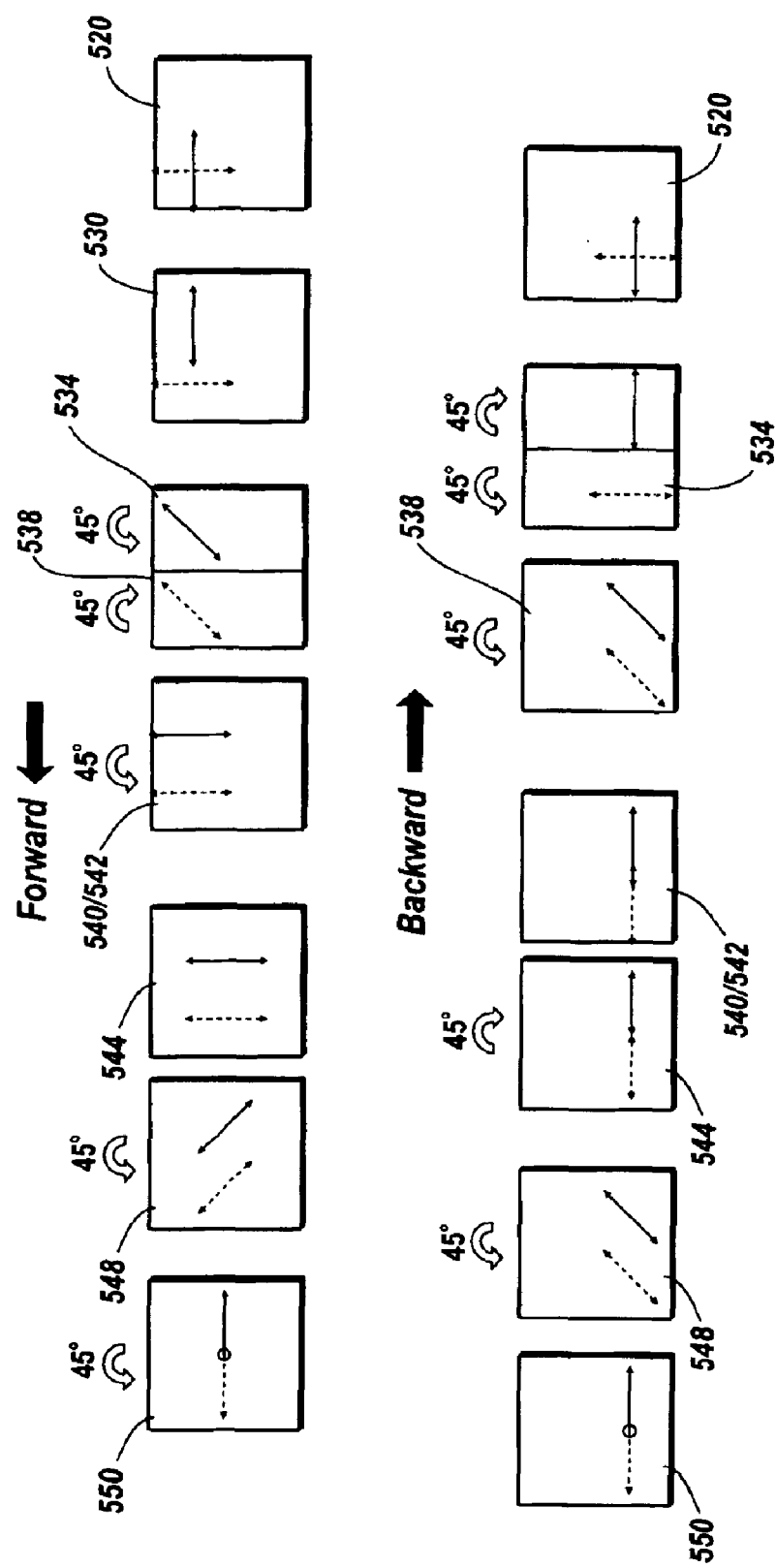
FIG. 8D is a diagram showing the direction of polarization of each split, polarized beam as the beams move from the input fiber, through the wave guide amplifier and are combined again at the output fiber.

The beam splitter 530 separates the input beam into two beams 512 and 514 based upon the polarization of the input beam (FIG. 8D). The beam splitter 530 is one example of a polarization shifting component and also one example of a beam shifting component. Various beam splitters may be used to perform the desired function and may optionally include one or more coatings to aid with preventing reflection losses and splitting the input beam into beams 512 and 514.

The beam splitter 530 optically communicates with a waveplate 534, such as a λ/2 waveplate, and a Faraday rotator 538 of core 506. This combination changes a polarization of one of beams 512, 514 so that both beams 512, 514 have the same polarization state (FIG. 7D). Each of waveplate 534 and Faraday rotator 538 may be considered a polarization shifting component. Although reference is made to a λ/2 waveplate and a Faraday rotator combination to achieve the polarization change, one skilled in the art ill understand that various other combinations of optical components may perform the same function.

The two beams 512, 514 propagate from rotator 538 and pass through a birefringence crystal wedge pair 540, 542 and a birefringence crystal beam displacer 544 of core 506. These wedges 540, 542 and displacer 544 cause beams 512 and 514 to bend toward a center of each wedge 540, 542 and displacer 544. These wedges 440, 442 and displacer 444 may be considered individually as beam shifting components and collectively as a beam shifting assembly. As with other optical components described herein, wedges 540, 542 and displacer 544 or other optical components capable of performing the same function may optionally include one or more coatings to aid with bending beams 512 and 514 to a center or longitudinal axis of circulator 502.

Once beams 512 and 514 have been bent by wedges 540, 542 and displacer 544 they propagate through another waveplate 548/Faraday rotator 550 combination of core 506 that causes the polarization of beams 512, 514 to rotate another 90° in the same direction. Each of waveplate 548 and Faraday rotator 550 may be considered as a polarization shifting component. The beams 512 and 514 subsequently exit circulator 502 and pass into waveguide 504.

Waveguide 504 may have a similar configuration to the waveguides described herein. Consequently, waveguide 504 includes waveguides 562 and 564 and reflection coating or layer 566. Waveguide 562 receives beam 512, while waveguide 564 receives beam 514. It will be understood that the opposite is also possible by changing the configuration of beams splitter 530 and other optical components of circulator 502.

In operation, circulator 502 splits the input beam into two parallel beams 512, 514 using beam displacer 530, as illustrated in FIG. 8B. The two beams 512, 514 have orthogonal polarizations, as shown in FIG. 8D, and are spaced apart at a distance referred to as the walk-off distance. The two beams 512, 514 propagate through waveplate 534 and Faraday rotator 538 so that the polarization of one of two beams 512 and 514 is rotated 90°, as illustrated in FIG. 8D, causing beams 512 and 514 to have the same polarization.

With reference to FIG. 8C, two beams 512, 514 propagate through wedge pair 540, 542 and displacer 544 causing them to bend toward the center while maintaining the polarization of each beam, as represented in FIG. 8D. The two beams 512, 514 propagate through another waveplate 548 and Faraday rotator 550 changing the polarization of beams 512, 514 to rotate a total of 90° in the same direction, i.e., 45° shift in polarization from each of waveplate 548 and Faraday rotator 550. The two beams 512, 514 pass into and are reflected from waveguide 504.

The reflected beams, now designated 512A and 514A in FIGS. 8A–8C pass back through Faraday rotator 550 and waveplate 548, which rotate the polarization of beams 512A and 514A by 45° in one direction, such as a counterclockwise direction, and 450 in the opposite direction, such as a clockwise direction, as illustrated in FIG. 7D. Therefore, the polarization of beams 512A, 514A remains the same because of the properties of waveplate 548 and Faraday rotator 550.

Beams 512A, 514A pass back through wedge pair 540, 542 and displacer 544. Since the polarizations of beams 512A, 514A are different from the forward propagating beams 512, 514, beams 512A and 514B are bent in the opposite direction to beams 512 and 514 after they travel through wedge pair 540, 542 and displacer 544. The polarization of beam 514A rotates 90°, as illustrated in FIG. 8D, so that the polarization of beams 512A and 514A are again orthogonal after propagating back through Faraday rotator 538 and waveplate 534. The orthogonal beams 512A, 514A are then combined by beam displacer 530 and coupled into an output fiber 518 by lens 520.

This embodiment of a planar waveguide optical amplifier 400 can be effectively used to amplify data signals that are transmitted between, for example, 20 km and 120 km. Light signals that are transmitted shorter distances often do not require amplification and optical signals that are transmitted longer distances are often more efficiently amplified using a different technique. One advantage of configuring an amplifier 500 in the manner shown such that the input port 510 and the output port 518 are collocated on the same side of the waveguide 504 is that the amplifier 500 can more easily be positioned in a Through Hole Transistor Online (TO) package, as shown in FIG. 9B.

FIGS. 9A and 9B show two embodiments of a waveguide device package, each of which uses an integrated circulator, waveguide assembly, and waveguide according to one aspect of the present invention. In FIG. 9A, integrated device 600 has a housing 602 having a first side 604 and a second side 606. Mounted at first side 604 of housing 602 is a circulator 610. Circulator 610, such as one of the circulators described herein, has a distal end 612 and a proximal end 614. The distal end 612 mounts to first side 604, while proximal end 614 cooperates with both an input fiber 616 and an output fiber 618. The circulator 610 optically communicates with a waveguide assembly or waveguide 620 disposed within housing 606. As with circulator 610, waveguide assembly or waveguide 620 may have a similar configuration to the other waveguides and waveguide assemblies described herein.

FIG. 9B illustrates another configuration of an optical device that may incorporate a circulator, waveguide, and/or waveguide assemblies of the present invention. The integrated device 650 has a housing 652 having a first side 654 and a second side 656. Mounted at first side 654 of housing 652 are an input optical fiber 660 and an output optical fiber 662 that optically communicate with a circulator 672 disposed within an interior of housing 652. Disposed at second side 656 is a transistor outline (TO) 666 that receives a waveguide assembly 670 and optionally a pump laser (not shown). The TO 666 protects waveguide assembly 670 and the pump laser or other optical components that may be used to amplify the beams traversing waveguide assembly 670.

Extending from TO 666 are leads 674 that may connect to electrical and optical components that may be used to operate TO 666. These leads 674 are sealed relative to the remainder of TO 666 in order to electrically isolate them from a base thereof. Also, leads 674 are hermetically sealed to the base of TO 666 to provide mechanical and environmental protection for the components contained in TO 666.

Therefore, the present invention provides an optical amplifier that uses the features and structures of a circulator to prepare an input beam for amplification. The circulator controls the polarization of the beams entering into the amplifier of the waveguide package, thereby directing beams having the desired polarization to the amplifier rather than directing beams having any polarization state to the amplifier. Further, the present invention provides a waveguide package where the input port and output ports of the package are collocated upon one side of the package rather than on opposite sides of a package as is currently taught by existing technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A waveguide optical amplifier package comprising:
   (a) a circulator having an input port adapted to receive an input beam and an output port and adapted to propagate an output beam having a power level greater than said input beam, said circulator being adapted to create a first beam and a second beam from said input beam; and
   (b) a planar waveguide optically communicating with said circulator, said waveguide being adapted to receive said first beam and said second beam and reflect an amplified first beam and an amplified second beam that have greater power levels than said first beam and said second beam, wherein said circulator is adapted to combine said first amplified beam and said second amplified beam to form said output beam.

2. The package as recited in claim 1, wherein said circulator is adapted to separate said first beam has a first polarization state and said second beam has a second polarization state orthogonal to said first polarization state.

3. The package as recited in claim 1, wherein said circulator is adapted to direct said first beam and said second beam to said waveguide.

4. The package as recited in claim 1, wherein said circulator is adapted to change a polarization of said first beam and said second beam so that both said first beam and said second beam have substantially the same polarization state.

5. The package as recited in claim 1, wherein said circulator comprises:
   (a) a beam splitter adapted to receive said input beam and output said first beam and said second beam; and
   (b) at least one polarization shifting component adapted to receive said first beam and said second beam and change said first polarization state and said second polarization state to a polarization state common to both said first beam and said second bean.

6. The package as recited in claim 1, wherein said waveguide comprises a first waveguide and a second waveguide, said first waveguide being adapted to receive said first beam and said second waveguide being adapted to receive said second beam.

7. The package as recited in claim 1, wherein said waveguide comprises a reflective coating adapted to reflect said first beam and said second beam.

8. A waveguide optical amplifier package comprising:
   (a) a planar waveguide adapted to receive a first beam and a second beam through a first end and output an amplified first beam and an amplified second beam, which have greater power levels than said first beam and said second beam, from said first end;
   (b) a circulator, optically communicating with said waveguide, having an input port and an output port collocated upon a circulator first end, said circulator being adapted to deliver said first beam and said second beam to said waveguide and being adapted to create an output beam from said first amplified beam and said second amplified beam, said output beam being output from said circulator at said output port.

9. The package as recited in claim 8, wherein said circulator is adapted to separate said first beam that has a first polarization state and said second beam that has a second polarization state orthogonal to said first polarization state.

10. The package as recited in claim 8, wherein said circulator is adapted to direct said first beam and said second beam to said waveguide.

11. The package as recited in claim 8, wherein said circulator is adapted to change a polarization of said first beam and said second beam so that both said first beam and said second beam have substantially the same polarization state.

12. The package as recited in claim 8, wherein said input port is disposed from said output port on said circulator first end.

13. The package as recited in claim 8, wherein said circulator comprises:
   (a) a beam splitter adapted to receive said input beam and output said first beam and said second beam; and
   (b) at least one polarization shifting component adapted to receive said first beam and said second beam and change said first polarization state and said second polarization state to a polarization state common to both said first beam and said second beam.

14. The package as recited in claim 13, wherein said at least one polarization shifting component comprises:
   a first pair of optical components optically communicating with said beam splitter, said first pair of optical components comprising at least one first waveplate and at least one first Faraday rotator;
   a plurality of crystal wedges optically communicating with said first pair of optical components; and
   second pair of optical components optically communicating with said plurality of wedges and said waveguide, said second pair of optical components comprising at least one second waveplate and at least one second Faraday rotator.

15. The package as recited in claim 13, wherein said at least one polarization shifting component comprises:
   a first pair of optical components optically communicating with said beam splitter, said first pair of optical components comprising at least one first waveplate and at least one first Faraday rotator;
   a beam shifting assembly optically communicating with said first pair of optical components, said beam shifting assembly comprising a pair of crystal wedges and a beam displacer; and
   a second pair of optical components optically communicating with said beam shifting assembly and said waveguide, said second pair of optical components comprising at least one second waveplate and at least one second Faraday rotator.

16. The package as recited in claim 13, wherein said at least one polarization component comprises at least one of a waveplate, a Faraday rotator, and a wedge.

17. The package as recited in claim 8, wherein said waveguide comprises a first waveguide and a second waveguide, said first waveguide being adapted to receive said first beam and said second waveguide being adapted to receive said second beam.

18. The package as recited in claim 17, wherein said waveguide comprises a reflective coating adapted to reflect said first beam and said second beam.

19. The package as recited in claim 8, wherein said waveguide comprises a U-shaped waveguide.

20. The package as recited in claim 19, wherein said U-shaped waveguide is angularly orientate relative to a normal of said first end of said waveguide.

21. The package as recited in claim 8, wherein said waveguide comprises at least one amplifier waveguide.

22. The package as recited in claim 8, wherein said waveguide comprises at least one tunable filter waveguide.

23. The package as recited in claim 8, further comprising a TO package cooperating with said waveguide and said circulator.

24. The package as recited in claim 23, wherein said waveguide is incorporated within said TO package.

25. A waveguide optical amplifier package that receives an input beam from an input optical fiber and delivers an output beam to an output fiber, said package comprising:
   (a) a circulator adapted to receive the input beam from the input optical fiber and deliver the output beam to the output optical fiber, said circulator comprising:
      (i) an input port adapted to receive said input beam;
      (ii) an output port adapted to output said output port, said input port and said output port being collocated upon a first circulator end of said circulator; and
      (iii) a core adapted to receive said input beam, separate said input beam into a first beam and a second beam, and change a polarization state of at least one of said first beam and said second beam so that both said first beam and said second beam have a common polarization state; and
   (b) a planar waveguide comprising:
      (i) a first end adapted to receive said first beam and said second beam; and
      (ii) a second end adapted to reflect said first beam and said second beam so that said first beam and said second beam are output at said first end, wherein a power level of each of said first beam and second beam is increased as said first beam and said second beam traverse said waveguide.

26. The package as recited in claim 25, wherein said core comprises:
   (a) a beam splitter adapted to receive said input beam and output said first beam and said second beam; and
   (b) at least one polarization shifting component adapted to receive said first beam and said second beam and change said first polarization state and said second polarization state to a polarization state common to both said first beam and said second beam.

27. The package as recited in claim 26, wherein said at least one polarization shifting component comprises:
   a first pair of optical components optically communicating with said beam splitter, said first pair of optical components comprising at least one first waveplate and at least one first Faraday rotator;
   a plurality of crystal wedges optically communicating with said first pair of optical components; and
   a second pair of optical components optically communicating with said plurality of wedges and said waveguide, said second pair of optical components comprising at least one second waveplate and at least one second Faraday rotator.

28. The package as recited in claim 26, wherein said at least one polarization shifting component comprises:
   a first pair of optical components optically communicating with said beam splitter, said first pair of optical components comprising at least one first waveplate and at least one first Faraday rotator;
   a beam position shifting assembly optically communicating with said first pair of optical components, said beam position shifting assembly comprising a pair of crystal wedges and a beam displacer; and
   a second pair of optical components optically communicating with said beam position shifting assembly and said waveguide, said second pair of optical components comprising at least one second waveplate and at least one second Faraday rotator.

* * * * *

UNITED STATES PATENT AND TRADEMARK OFFICE
CERTIFICATE OF CORRECTION

PATENT NO.        : 6,882,764 B1                                Page 1 of 3
APPLICATION NO. : 10/646422
DATED             : April 19, 2005
INVENTOR(S)       : Deng et al.

It is certified that error appears in the above-identified patent and that said Letters Patent is hereby corrected as shown below:

Title Page,
Item (56), under "OTHER PUBLICATIONS", line 5, change "Augusy" to --August--
Item (56), under "OTHER PUBLICATIONS", line 6, change "articlesearch/aug1998mj.htm," to --articlesearch/aug1998mj.html,--

Drawings
Replace FIG. 9B with the figure depicted herein below, wherein a new reference of "666" has been added and the original "666" has been changed to --674--

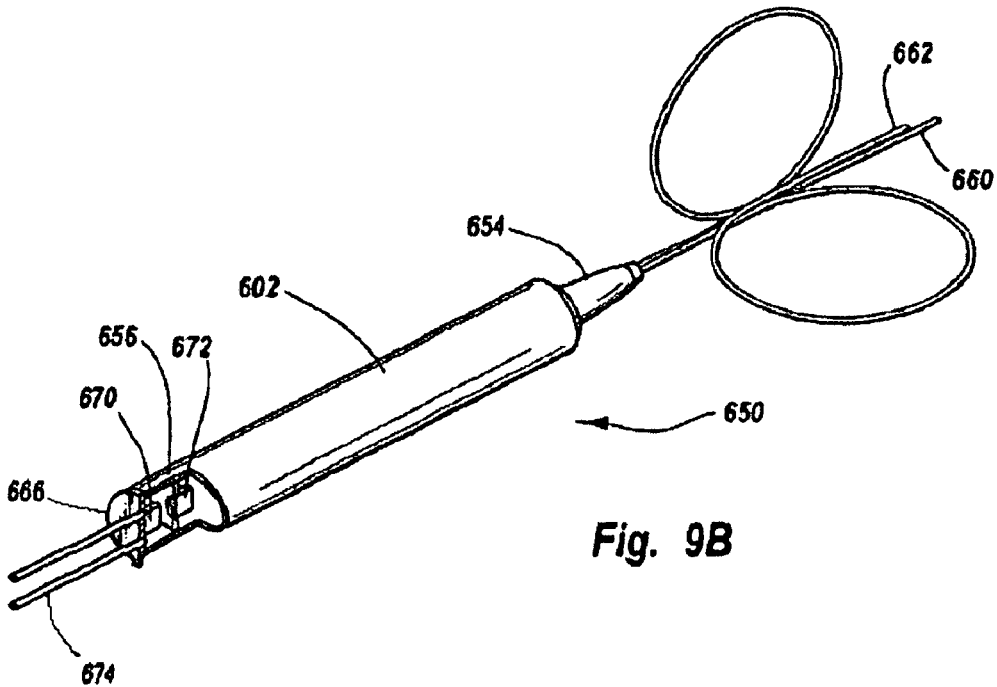

Fig. 9B

UNITED STATES PATENT AND TRADEMARK OFFICE
CERTIFICATE OF CORRECTION

PATENT NO. : 6,882,764 B1
APPLICATION NO. : 10/646422
DATED : April 19, 2005
INVENTOR(S) : Deng et al.

It is certified that error appears in the above-identified patent and that said Letters Patent is hereby corrected as shown below:

Column 2,
Line 12, change "birefringence" to --birefringent--
Lines 21-22, change "birefringence" to --birefringent--
Line 36, change "signal" to --signals--
Line 37, change "lesser" to --less--
Line 67, change "theses" to --these--

Column 3,
Lines 39-40, before "the wave guide optical amplifier shown in FIG. 7A;" remove "the wave guide optical amplifier shown in FIG. 7A;"

Column 6,
Line 32, before "are not reflected" change "so" to --therefore--
Line 55, remove "406"
Line 56, remove "406"

Column 7,
Line 9, remove "406"
Line 15, change "ill" to --will--
Line 32, remove "406"
Line 64, change "450 shift" to --45° shift--

Column 8,
Line 4, change "450 in one direction" to --45° in one direction--
Line 13, change "414B" to --414A--
Line 56, remove "506"
Line 57, remove "506"

Column 9,
Line 10, remove "506"
Line 16, change "ill" to --will--
Line 20, change "birefringence" to --birefringent--
Line 21, change "birefringence" to --birefringent--
Line 21, remove "506"
Line 34, remove "506"

UNITED STATES PATENT AND TRADEMARK OFFICE
CERTIFICATE OF CORRECTION

PATENT NO. : 6,882,764 B1
APPLICATION NO. : 10/646422
DATED : April 19, 2005
INVENTOR(S) : Deng et al.

It is certified that error appears in the above-identified patent and that said Letters Patent is hereby corrected as shown below:

Column 10,
Line 5, change "450" to --45°--
Line 13, change "514B" to --514A--
Line 53, change "housing 652" to --housing 602--
Lines 54-55, change "housing 652" to --housing 602--
Line 57, change "housing 652." to --housing 602.--

Column 11,
Line 27, after "output port" remove "and"
Line 41, after "first beam" change "has" to --having--
Line 42, after "second beam" change "has" to --having--

Column 12,
Line 48, before "second pair" insert --a--

Column 13,
Line 17, change "orientate" to --oriented--

Signed and Sealed this

Twenty Second Day of April, 2008

JON W. DUDAS
*Director of the United States Patent and Trademark Office*